R. E. HALL.
ARTICULATOR.
APPLICATION FILED JUNE 20, 1916.
1,218,178.                                Patented Mar. 6, 1917.
3 SHEETS—SHEET 3.
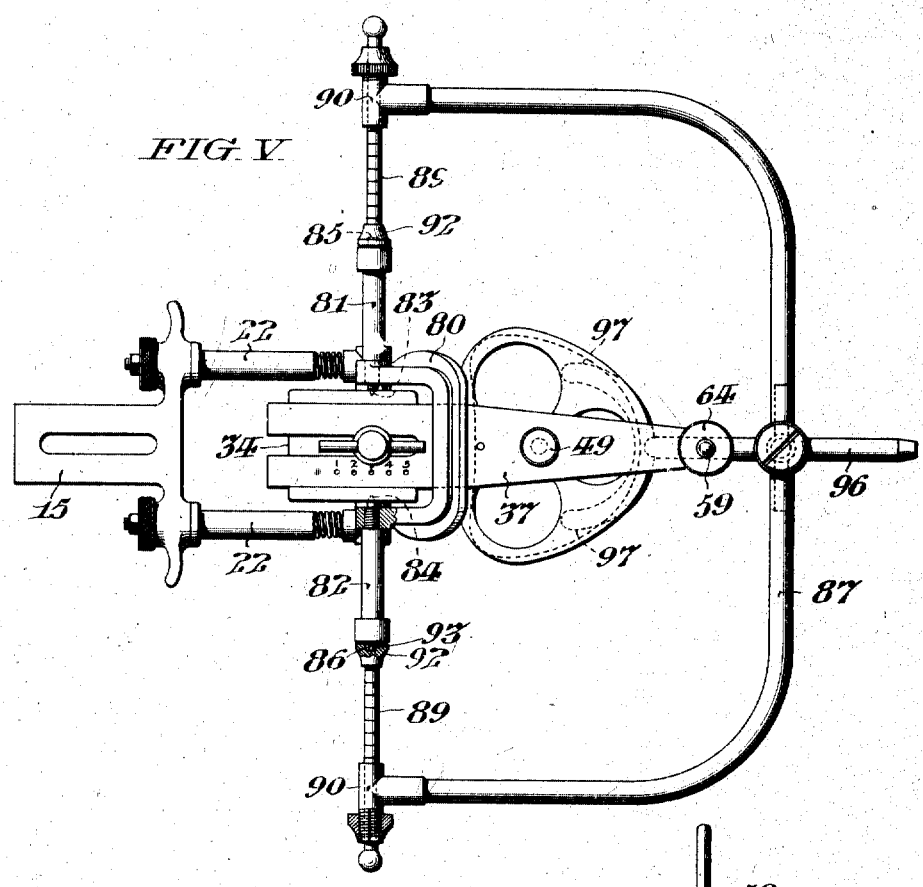
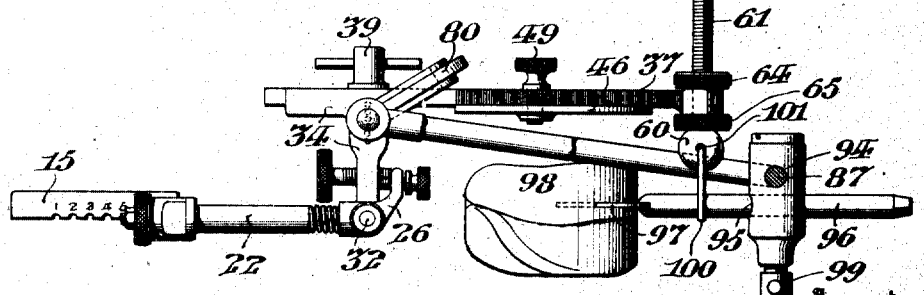
Witness
Edward T. Simpson Jr.
Inventor
Rupert E. Hall,
By Clifton C. Caldwell
Attorney

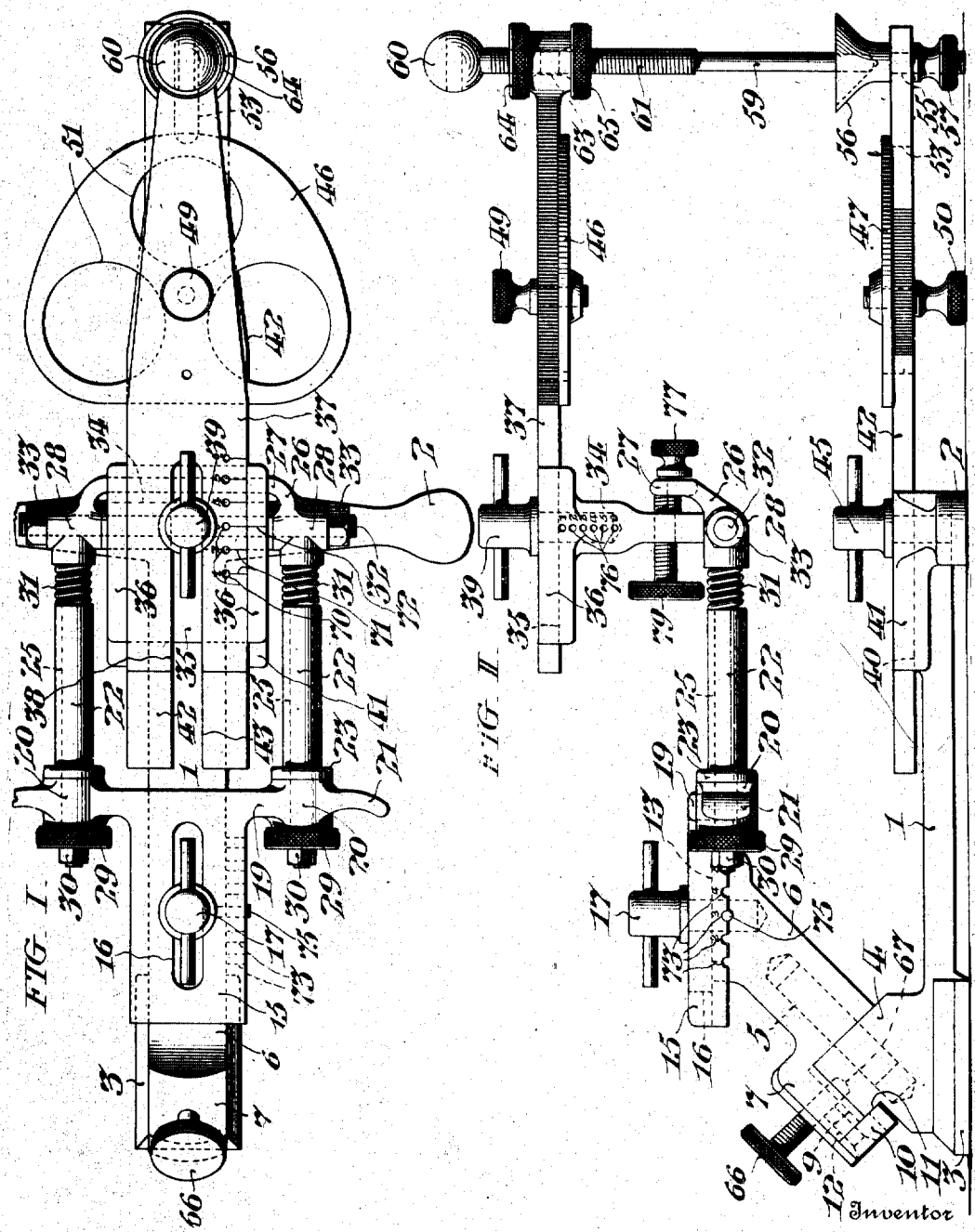

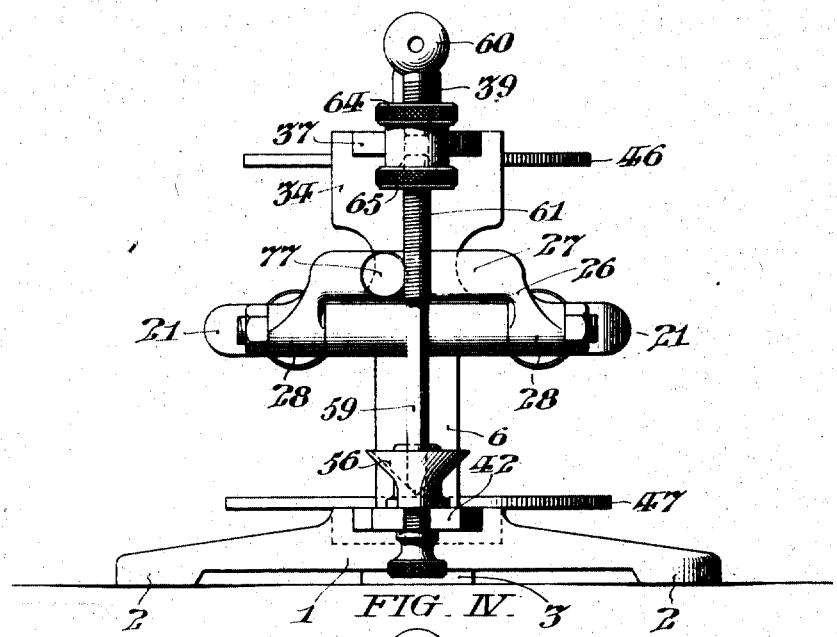
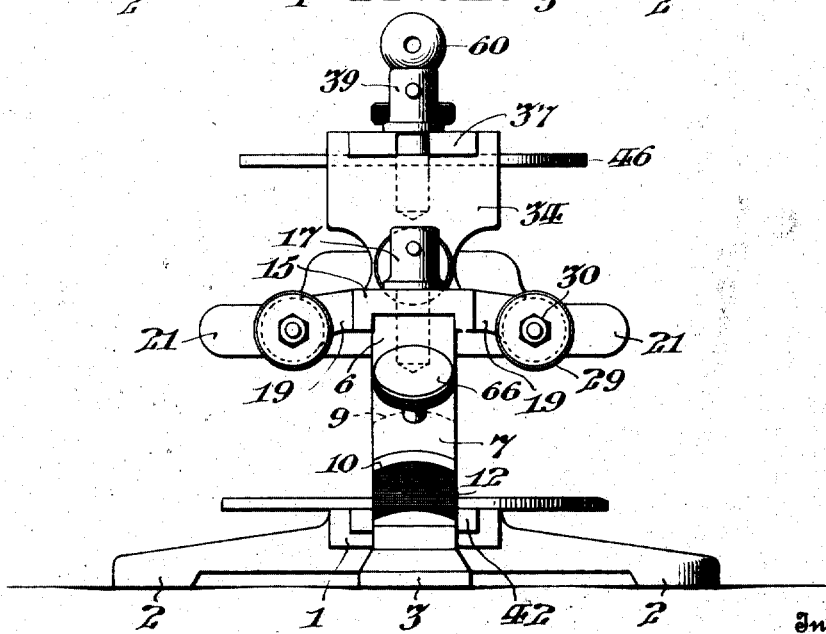

UNITED STATES PATENT OFFICE.

RUPERT E. HALL, OF PHILADELPHIA, PENNSYLVANIA.

ARTICULATOR.

1,218,178.

Specification of Letters Patent.   Patented Mar. 6, 1917.

Application filed June 20, 1916.   Serial No. 104,812.

*To all whom it may concern:*

Be it known that I, RUPERT E. HALL, a citizen of the United States, and a resident of Philadelphia, in the county of Philadelphia, State of Pennsylvania, have invented certain new and useful Improvements in Articulators, of which the following is a specification, reference being had to the accompanying drawings.

My invention relates particularly to that class of devices which are commonly known as dental articulators, and which are arranged to support for relative movement sets of artificial teeth in such relation as to simulate the movement of the teeth carried by the human jaw.

The principal objects of my invention are, to provide mechanism that will not only reproduce with precision the natural relative masticatory movements of the human jaws, but which may be so adjusted as to vary the overbite relation of the opposing teeth carried thereby.

Other objects of my invention are, to provide an articulator having adjustable means for accurately setting the jaw model holding parts in accordance with the measurements and conditions found in each individual case.

My invention comprehends means for supporting suitable measuring implements, such as a face-bow of any well known construction, at different distances from the plane of occlusion of the jaw models.

Specifically stated, the form of my invention as hereinafter described comprises upper and lower jaw model carriers so pivoted together that the central incisive point traverses a geodesic path conforming to a conical surface, and provides means for varying the longitudinal relation of the jaw model carriers, whereby the teeth of the jaw models may be occluded with varying degrees of overbite.

My invention also includes all of the various novel features of construction and arrangement as hereinafter more definitely specified.

In the accompanying drawings, Figure I is a plan view of an articulator conveniently embodying my invention; Fig. II is a side elevational view of said articulator; Fig. III is a front elevational view of the articulator shown in Figs. I and II; Fig. IV is a rear elevational view of said articulator; Fig. V is a plan view on a reduced scale of the forward upper portion of said articulator, showing the face-bow attached thereto; and Fig. VI is a side elevational view of the structure shown in Fig. V.

In said figures, the base 1 is provided at its forward end with laterally projecting feet 2 and at its rear end with the pedestal 3 forming the bearing abutment 4, which carries the pintle 5 projecting therefrom in forwardly oblique relation and has its axis disposed approximately forty-five degrees with the horizontal plane of the base.

The pintle 5 is arranged to rotatably support the swivel post 6, which has the projecting extension 7 overlying and conforming to the curved surface 9 of the bearing abutment 4, and has the lip 10 projecting under the shoulder 11 of said bearing abutment 4, said lip being secured to the extension 7 by the screws 12.

The swivel post 6 extends obliquely in alinement with the axis of the pintle 5 and is provided at its upper end with a horizontal surface 13 upon which the slide plate 15 is supported for longitudinal adjustment, being provided with the longitudinally extending slot 16 through which the thumbscrew 17, which is in threaded engagement with the swivel post 6, extends. Said slide plate 15 is provided with laterally extending oppositely directed arms 19 affording bearings 20 which have laterally projecting finger pieces 21, the purpose of which will be hereinafter described.

Conveniently mounted in the bearings 20 are bushing sleeves 22, each having a collar 23 arranged to abut against the forward surface of the bearing 20. Said bushing sleeves 22 provide parallel guides for the slide rods 25 of the yoke 26, which comprises the transverse bar 27 and lateral bearings 28 from which said slide rods 25 project rearwardly. The slide rods 25 extend through the bushing sleeves 22 and project rearwardly from the bearings 28 and are provided with thumb-nuts 29 and jam-nuts 30 arranged to hold said thumb-nuts in adjusted position on said rods 25.

The yoke 26 is normally pressed forward by spiral springs 31 which encircle the respective rods 25 and have their opposite ends bearing against the forward end of the sleeves 22 and the rearward surface of the yoke 26. The yoke 26 carries the transversely extending shaft 32, which is held in place by nuts 33 threaded upon its opposite ends exterior of the bearings 28 through which it extends, and said shaft pivotally carries the chair 34 which provides a seat 35 having lateral upwardly extending flanges 36, between which the upper jaw model mounting slide plate 37 is seated. Said slide plate 37 is provided with the longitudinally extending slot 38 through which the thumb-screw 39, which is in threaded engagement with said chair 34, extends, and which is arranged to clamp said plate in different longitudinal positions with respect to said chair.

The forward end of the base 1 is similarly provided with a seat 40 having laterally disposed upwardly extending flanges 41, between which the lower jaw model mounting slide plate 42 is disposed, said slide plate 42 being provided with the slot 43 through which the set-screw 45, which is in threaded engagement with the base 1, extends, and which is arranged to clamp the slide plate 42 in different longitudinal positions with respect to said base.

The slide plates 36 and 42 carry the respective jaw model mountings 46 and 47, which are engaged with said plates by the thumb-screws 49 and 50 respectively, said mountings 46 and 47 being preferably provided with perforations 51, as shown in Fig. I, to provide anchorage for the plaster jaw models.

The forward end of the plate 42 is provided with a slot 53, through which the shank 55 of the conical cup 56 extends and in which said shank 55 is adjusted longitudinally and arranged to be clamped by the set-screw 57, which is in threaded engagement with said shank.

Said conical cup 56 is arranged to receive and support the free end of the pin 59 which is provided with a ball end 60 and has a threaded portion 61 arranged to extend through the aperture 63 in the forward end of the plate 37, to which said pin may be secured in different vertical positions by the nuts 64 and 65 respectively disposed above and below said plate.

The upper portion of the articulator including the swivel post 6 is normally arranged to rock upon the pintle 5 with respect to the lower portion of the articulator including the base 1, but may be locked in rigid relation with respect thereto by the set-screw 66 which is in threaded engagement with the extension 7 of the swivel post 6 and projects therethrough into a suitable aperture 67 disposed in the curved surface of the bearing abutment 4.

It has been found that in the human skull the condyles bear a specific relation to the central incisal point of the teeth and to the occipital protuberance, and therefore the movable parts of the articulator are so graduated that the jaw model carriers are adjusted to provide the proper measurement between the central incisal point and the condyle points. The articulator is adjusted to similarly vary the relation between the condyle points and the pivotal point of the upper movable part of said articulator, and for this purpose the jaw model mounting supporting plates 37 and 42 are provided with suitably graduated indicating points 70 respectively arranged to register with a fixed point on the chair 34, and preferably have the scribe marks 71 arranged to register with the scribe mark 72 on the flange 36 of the chair 34. Similarly, the slide plate 15 is provided on its under surface with notches 73 arranged to engage a pin 75 projecting laterally from the swivel post 6, as shown in Fig. II.

Corresponding to the graduations 70 on the plate 37 and the graduations 73 on the plate 15, the chair 34 is provided in its opposite sides with suitably spaced apertures 76, so spaced as to respectively provide points of connection with the face-bow, to be hereinafter described, and corresponding to the condyle axes of different patients, and in accordance with the measurements found in individual cases, the numerical notation on the respective graduations 70, 73 and 76 correspond with each other, so that when the measurement of a particular case is found to correspond to the graduation 3, as in the illustration, the third graduation is to be employed throughout that particular case.

The chair 34 is provided with a stop for normally holding it in a predetermined adjusted position by the set-screw 77 which extends through the transverse bar 27 of the yoke 26, in threaded engagement therewith, and against which set-screw said chair is arranged to bear. The chair may, however, be adjusted toward and from the transverse bar 27 to raise and lower the upper jaw model with respect to the lower jaw model by the rotation of the set-screw 79 which is in threaded engagement with said chair, extending therethrough and bearing upon the transverse bar 27, as best shown in Fig. II.

In Figs. V and VI I have illustrated the application of the face-bow to the articulator, of which the upper portion is illustrated as detached from the swivel post 6, and is on a slightly reduced scale for convenience of illustration. In order to apply said face-bow to the articulator in varying distances from the occlusal plane of the opposing jaw models, I have provided an adjustable bracket comprising a stirrup-shaped member 80 arranged to straddle the plate 37 and the chair 34 and having lateral extensions 81 and 82 providing inwardly and oppositely directed points 83 and 84 and having at their outer opposite ends tenons 85 and 86 to receive the face-bow as hereinafter described.

The extension 81 may preferably be in rigid relation to the member 80, while the extension 82 is in threaded engagement therewith and adjustable to retract the point 84 toward and from the point 83, whereby said points may be adjusted into different vertical heights and engaged with any of the oppositely disposed apertures 76 upon the opposite sides of the chair 34 and in accordance with the different measurements of the jaws of the respective patients.

The face-bow, which is of well known construction, comprises the arched bar 87 having adjustable rods 89 mounted in suitable bearings 90 at its opposite ends, said bearings having threaded tapering split extensions provided with nuts which may be adjusted to bind the bearings upon the rods 89, which are provided at their inner ends with heads 92 having sockets 93 arranged to receive the tenons 85 and 86 respectively.

Carried by the arched bar 87 and slidable longitudinally thereon is a clamping member of well known construction having transversely disposed openings 94 through which the arched bar 87 may slide, and the opening 95 arranged to receive the stem 96 having the bifurcated curved prongs 97 for engaging the trial plate or wax model 98. Said clamping member may be adjusted to clamp the stem 96 to the arched bar 87 in rigid relation by the thumb-screw 99.

In operating the device, a trial plate having been previously prepared and fitted in the mouth of the patient and the bite taken in the usual manner, the bifurcated prongs 97 are heated and forced into the front face of the upper trial plate so that they are firmly attached thereto. The trial plate is then placed in the mouth and the face-bow is attached thereto by means of the clamping member having the thumb-screw 99. The inner ends of the adjusting rods 89 are then slipped into engagement with the sides of the head of the patient opposite the mandibular joints, the clamping screw being then adjusted to secure the arched bar 87 and stem 96 in rigid relation, in accordance with the relative position of the trial plate and the position of the condyles as found by the adjusting rods 89. Having thus determined this position, the face-bow and the attached trial plate are removed from the head and mouth of the patient and applied to the articulator in such manner that the incisal point of the trial plate model will be in a horizontal line with the axis of oscillation of the chair 34, which will determine the position of the points 83 and 84 with respect to the plane of occulsion, whereupon the extensions 81 and 82 having their tenons 85 and 86 engaged with the sockets 93, have their opposing points inserted into the opposite apertures 76 in the opposite sides of the chair 34, whereupon the forward end of the face-bow may be supported by a ligature 100 passing through an opening 101 in the ball 60 of the pin 59 which may be, as shown in Fig. VI, inverted to provide a hanger for said face-bow and the model carried thereby.

Having thus determined the position of the wax models, they are connected with the respective upper and lower model mountings 46 and 47 by plaster in a well known manner.

It may be here noted that the teeth may be ground by occluding them with varying degrees of overbite, by longitudinally adjusting the yoke 26 with respect to the slide plate 15, which is conveniently accomplished by rotating the thumb-nuts 29 upon the threaded slide rods 25 in opposition to the springs 31, which permit the longitudinal movement of the upper jaw model with respect to the lower jaw model, by pressing said yoke 26 toward said slide plate 15 independently of the adjustment of the thumbnuts 29 by engaging the yoke 26 and finger pieces 21 between the thumb and fore fingers of the operator.

I do not desire to limit my invention to the precise details of construction and arrangement as herein set forth, as it is obvious that various modifications may be made therein without departing from the essential features of my invention as defined in the appended claims.

Having thus described my invention, I claim:

1. A dental articulator comprising a lower jaw model holder, an upper jaw model holder pivoted thereto, spaced means tending to yieldingly force said jaw model holders into registry, and means for relatively adjusting said jaw model holders substantially parallel with their longitudinal axes in opposition to said yielding means.

2. A dental articulator comprising a lower jaw model holder, an upper jaw model holder movable laterally with respect thereto, laterally disposed parallel supports movably carrying said upper jaw model holder, means tending to yieldingly force said jaw model holders into registry, and means for relatively adjusting said jaw model holders longitudinally in opposition to said yielding means.

3. A dental articulator comprising a lower jaw model holder, an upper jaw model holder movable laterally with respect thereto, springs disposed upon opposite sides of the medial plane tending to force said jaw model holders into registry in the direction of their longitudinal axes, and means acting in opposition to said springs adjustable to vary the longitudinal relation of said jaw model holders.

4. A dental articulator comprising a lower jaw model holder, an upper jaw model holder pivoted thereto on an axis extending oblique to the plane of occlusion of the jaws, means tending to yieldingly force said jaw model holders into registry, and means for relatively adjusting said jaw model holders substantially parallel with their longitudinal axes in opposition to said yielding means.

5. A dental articulator comprising a base, a lower jaw model holder carried by said base and adjustable longitudinally with respect thereto, a frame pivoted to said base upon an axis oblique to the plane of occlusion of said jaws and adjustable longitudinally, and an upper jaw model holder carried by said frame and adjustable with respect thereto, said frame and jaw model holders each having graduations for determining their relative adjustment.

6. A dental articulator comprising a base, a lower jaw model holder carried by said base and longitudinally adjustable with respect thereto, a frame pivoted to said base on an axis disposed obliquely with respect to said base and longitudinally adjustable thereon, and an upper jaw model holder hingedly carried by said frame and longitudinally adjustable thereon, said frame and model holders having graduations for determining their relative longitudinal adjustments, and said frame having graduations for determining the position of the condyle points of the jaw models carried by said jaw model holders with respect to the occlusal plane.

7. A dental articulator comprising a lower jaw model holder, an upper jaw model holder pivotally connected thereto and arranged to oscillate laterally with the medial point of the upper jaw model describing a geodesic line about the surface of a cone.

8. A dental articulator having relatively movable upper and lower jaw model holders, spring means disposed upon opposite sides of the medial plane tending to force said jaw model holders into registry, and threaded means connected with the upper jaw model holder at its opposite sides adjustable to vary the longitudinal relation of said jaw model holders.

9. In a dental articulator, the combination with a base, of a jaw model holder carried by said base, in adjustable relation therewith, a pintle carried by said base in inclined relation thereto, a swivel post mounted to oscillate on said pintle, a slide plate adjustably carried on said post, a frame carried by said slide plate, in adjustable relation thereto, and an upper jaw model holder hingedly connected with said frame and longitudinally adjustable thereon.

10. In a dental articulator, the combination with a base having a bearing whose axis extends in oblique relation to said base, a lower jaw model holder adjustably carried by said base, a swivel post mounted to rock on said bearing, a slide plate adjustably mounted on said swivel post, a frame carried by said slide plate, a chair hinged to said frame and arranged to rock on a horizontal axis, an upper jaw model holder carried by said chair and adjustable thereon, and means arranged to adjust said chair to vary the spaced relation of said jaw model holders.

11. In a dental articulator, the combination with a base having an inclined bearing, of a lower jaw model holder adjustable thereon, a cup carried by said holder, tapering downwardly toward its center, an upper jaw model holder pivotally carried by said base and arranged to rock with respect to said lower jaw model holder, and a pin on said upper jaw model holder having its free end arranged to rest in and ride upon the walls of said cup.

12. In a dental articulator, the combination with a base, of a lower jaw model holder adjustably mounted thereon, an upper jaw model holder pivotally carried by said base and arranged to rock laterally with respect thereto, a conical cup carried by said lower jaw model holder tapering downwardly toward the center, and a pin adjustably carried by said upper jaw model holder and arranged to rest in and ride upon the walls of said cup.

13. In a dental articulator, the combination with a base, of a lower jaw model holder carried by said base, an upper jaw model holder pivotally connected with said base and arranged to rock with respect thereto, and removable jaw model mountings, comprising perforated plates carried by said respective jaw model holders.

14. In a dental articulator, the combination with a base having an inclined bearing and provided with a lower jaw model holder, of a swivel post mounted to oscillate on said inclined bearing about an axis disposed obliquely to said base, an upper jaw model holder carried by said post, and means to lock said post with respect to said base.

15. In a dental articulator, the combination with a base having an inclined bearing, of a lower jaw model holder carried by said base, a swivel post mounted upon said bearing and arranged to oscillate about an inclined axis, an upper jaw model holder carried by said post, means interposed between said post and upper jaw model holder yieldingly forcing it into registry with the lower jaw model holder, and means adjustable upon the opposite sides of the medial plane for retracting said upper jaw model holder with respect to said lower jaw model holder.

16. A dental articulator adapted to be used in connection with a face-bow, comprising a base, a lower jaw model holder adjustably connected with said base, a frame pivoted to said base and arranged to rock laterally with respect thereto, and comprising a hinged joint adjustable with respect to the pivotal axis of said frame, an upper jaw model holder adjustable with respect to said hinged joint, and a plurality of graduated apertures in said frame at relatively different distances from the plane of occlusion of the jaw models, and means arranged to selectively engage said apertures for supporting the condyle members of said face-bow.

17. A dental articulator adapted to be used in connection with a face-bow, comprising a base, a lower jaw model holder adjustably connected with said base, a frame pivoted to said base and arranged to rock laterally with respect thereto, and comprising a hinged joint adjustable with respect to the pivotal axis of said frame, an upper jaw model holder adjustable with respect to said hinged joint, a plurality of graduated apertures in said frame at relatively different distances from the plane of occlusion of the jaw models, means arranged to selectively engage said apertures for supporting the condyle members of said face-bow, and means carried by said upper jaw model holder from which said face-bow may be suspended.

18. A dental articulator adapted to be used in connection with a face-bow, comprising a base, a lower jaw model holder adjustably connected with said base and having graduations, a frame having graduations, pivoted to said base and arranged to rock laterally with respect thereto, and comprising a hinged joint adjustable with respect to the pivotal axis of said frame, an upper jaw model holder adjustable with respect to said hinged joint and having graduations, a plurality of graduated apertures in said frame at relatively different distances from the plane of occlusion of the jaw models, and means arranged to selectively engage said apertures for supporting the condyle members of said face-bow, said graduations in the jaw model holders and frame being arranged to determine the longitudinal relation of the articulator parts in accordance with the realtive position of the condyle points and occlusal plane as formed by the face-bow.

In witness whereof, I have hereunto set my hand this 20th day of June, A. D. 1916.

RUPERT E. HALL.

Witnesses:
WILLIAM J. RUSSELL,
CLIFTON C. HALLOWELL.